US010015548B1

(12) United States Patent
Gandhi et al.

(10) Patent No.: US 10,015,548 B1
(45) Date of Patent: Jul. 3, 2018

(54) RECOMMENDATION OF SEGMENTED CONTENT (71) Applicant: ARRIS Enterprises LLC, Suwanee, GA (US)

(72) Inventors: Bhavan Gandhi, Vernon Hills, IL (US); Andrew Aftelak, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/394,660

(22) Filed: Dec. 29, 2016

(51) Int. Cl.
*H04N 21/466* (2011.01)
*H04N 21/845* (2011.01)
*H04N 21/458* (2011.01)
*H04N 21/482* (2011.01)

(52) U.S. Cl.
CPC ....... *H04N 21/4668* (2013.01); *H04N 21/458* (2013.01); *H04N 21/466* (2013.01); *H04N 21/4828* (2013.01); *H04N 21/8456* (2013.01)

(58) Field of Classification Search
CPC . H04N 21/4668; H04N 21/458; H04N 21/466
See application file for complete search history.

(56) References Cited

U.S. PATENT DOCUMENTS

| 7,937,451 B2 | 5/2011 | Ho et al. |
| 7,962,330 B2 | 6/2011 | Goronzy et al. |
| 8,438,595 B1 | 5/2013 | Kannan |
| 2003/0093790 A1 | 5/2003 | Logan et al. |
| 2004/0073919 A1 | 4/2004 | Gutta et al. |
| 2006/0100963 A1 | 5/2006 | Leurs et al. |
| 2012/0278179 A1* | 11/2012 | Campbell .......... G06Q 30/0255 705/14.69 |
| 2014/0033036 A1 | 1/2014 | Gaur et al. |
| 2014/0088952 A1 | 3/2014 | Fife et al. |
| 2014/0111693 A9 | 4/2014 | Bonet et al. |

(Continued)

FOREIGN PATENT DOCUMENTS

| EP | 1835455 A1 | 9/2007 |
| WO | 02/102079 A1 | 12/2002 |

(Continued)

OTHER PUBLICATIONS

PCT International Search Report & Written Opinion, Re: Application No. PCTUS2017/065912, dated May 3, 2018.

*Primary Examiner* — Sumaiya A Chowdhury
(74) *Attorney, Agent, or Firm* — Stewart M. Wiener (57) ABSTRACT

A system and method are provided for recommending a segment of a segmented video asset of particular interest to a client. A copy of a video asset is created such that the copy is in the form of a set of segments for being transmitted to a client device for playback. A relationship is established between start and end times of each segment relative to a standard version of segments of the video asset, and metadata is generated for each segment of the copy. The metadata and relationship is used relative to the standard version with viewing data collected across a population of viewers having viewed the video asset to produce viewing metrics for each segment of the set of segments of the copy. The viewing metrics are provided to a recommender which uses the viewing metrics to generate a recommendation of a segment of the copy to a client.

15 Claims, 6 Drawing Sheets

(56) References Cited

U.S. PATENT DOCUMENTS

2015/0365725 A1 12/2015 Belyaev et al.
2016/0190945 A1 6/2016 Liu et al.
2016/0353139 A1 12/2016 Smith et al.

FOREIGN PATENT DOCUMENTS

| WO | 03/043332 A2 | 5/2003 |
| WO | 2004030360 A1 | 4/2004 |
| WO | 2004043067 A2 | 5/2004 |
| WO | 2007/130472 A2 | 11/2007 |
| WO | 2015/038749 A1 | 3/2015 |

\* cited by examiner

RECOMMENDATION OF SEGMENTED CONTENT

BACKGROUND

Network digital video recorders (nDVR), network personal video recorders (nPVR), remote storage digital video recorder (rs-DVR), and like equipment are network-based digital video recorders that may be stored or located on the cloud at a server location or at a content provider's location rather than at a consumer's private location or home. Such network devices have effectively increased the consumer's ability to time shift the consumption of programs (i.e., to record, download, or stream a program and ultimately consume the program or parts thereof at a later time that best suits the consumer). This ability to time shift also provides the consumer with enhanced power to consume only selected portions of programs by, for example, skipping or fast-forwarding through portions of recorded content, and also to consume parts of a program multiple times via use of rewinding or the like.

In an nDVR or time-shifted content delivery system, video content available for playback may be recorded, transcoded, and stored in several video formats. Typically, each format consists of a different video resolution and bitrate, to enable adaptive bitrate streaming. The multiplicity of different stream formats and bit rates enables the content to be sourced to devices with different capabilities, such as high definition televisions of wide ranging sizes, personal computers, tablet computers, smart phones, and other client devices. In addition, the different bit rates support adaptive streaming, whereby the receiving client has the ability to measure network congestion and request a lower or higher bit rate stream from the source which may eliminate visual impairments caused by network congestion (e.g. macro-blocking due to dropped packets, frozen frames) at the expense of higher resolution video. Any of several video delivery protocols, such as, for instance, HTTP Live Streaming, may be used to deliver the adaptive bitrate content to end users.

SUMMARY

According to an embodiment, a method of recommending a segment of a segmented video asset of particular interest to a client is provided. A video asset is segmented to create a copy of a video asset such that the copy is in the form of a set of segments for being transmitted to a client device for playback. A relationship between start and end times of each segment within the set of segments of the copy relative to a standard version of segments of the video asset is established. Metadata is generated for each segment within the set of segments of the copy, and the metadata and the relationship between the start and stop times of each segment within the set of segments of the copy relative to the standard version is used with viewing data collected across a population of viewers having viewed the video asset to produce viewing metrics for each segment of the set of segments of the copy. The viewing metrics are provided to a recommender which uses the viewing metrics to generate a recommendation of a segment of the copy of particular interest to a client.

According to another embodiment, a system of recommending a segment of a segmented video asset of particular interest to a client is provided. The system includes electronic apparatus having at least one processor configured to segment and create a copy of a video asset such that the copy is in the form of a set of segments for being transmitted to a client device for playback, establish a relationship between start and end times of each segment within the set of segments of the copy relative to a standard version of segments of the video asset, generate metadata for each segment within the set of segments of the copy, and use the metadata and the relationship between the start and stop times of each segment within the set of segments of the copy relative to the standard version with viewing data collected across a population of viewers having viewed the video asset to produce viewing metrics for each segment of the set of segments of the copy. The viewing metrics are provided to a recommender which uses the viewing metrics to generate a recommendation of a segment of the copy of particular interest to a client.

According to a further embodiment, a non-transitory computer-readable storage medium comprising stored instructions which, when executed by one or more computer processors, cause the one or more computer processors to perform the steps of the above referenced method.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Content in the form of a whole video asset may be spilt into discrete semantic segments, clips, or chapters. Each individual segment or clip may provide content objects that may be defined by bookmarks or tags. Thus, no editing is required in segmenting the asset and the clips or chapters are not derivative content. In order to aid potential interested viewers to navigate to or find segments of particular interest within a whole asset, embodiments disclosed herein utilize recommendation technology.

The use of conventional recommenders to help find content of segments of whole assets raises problems which are generally not present when recommending whole contents or assets. Thus, embodiments disclosed herein use content analysis and viewing metrics of individual segments of an asset to assist in the recommendation of individual segments of a video asset. The content analysis may be provided by media analysis or any form of metadata created by analysis of media, such as the analysis of video, audio, and closed captions. The viewing metrics may be data collected from past viewings of the asset by a population of viewers and may include historic user interactions (i.e., fast forward, rewind, etc.) having occurred during past viewings of the segments. Other forms of data gathering and analysis systems may also be utilized.

Recommending a chapter, clip, or segment may be similar to recommending a whole asset in some aspects. For instance, information as to how a chapter/clip was generated, how metadata is extracted on the chapter/clip, and how the metadata is used to recommend may be used as part of such a process. For example, so-called pure knowledge-based or content-based recommenders, discussed in greater detail below, may use the derived clip genome or metadata to provide a match to previous viewing behavior or user characteristics. A so-called collaborative filter may provide a match to similar users who have watched the segment or similar chapters.

In the recommendation of segments via collaborative filtering, for instance, it is necessary to find viewers that have a similar viewing behavior of the segments and measure the viewing of the clips in a video asset. However, in the viewing of individual clips or segments, it may not necessarily be clear that any two automatically segmented clips correspond to the same clip and same video content. For instance, there are steps of gathering viewings from a large population of unrelated viewers of clips from nDVR systems (where the clips have been generated separately, for instance, with different network-based digital video recorders) and matching these non-uniform clips across the large population of viewers of a whole asset as necessarily being the same. In a single copy world, segments of every copy of a whole asset would be the same. However, where every segmented copy is essentially unique, particularly due to the use of network-based digital video recorders, it cannot be assumed that every segment of every copy of a particular video asset is the same or even partially the same (i.e., have overlapping content).

Therefore, problems are experienced in generating recommendations of segments of video content that may be of interest to a particular viewer due to different copies of a video asset not necessarily being segmented in exactly the same manner.

Accordingly, embodiments disclosed herein provide methods and systems for generating recommendations of segments of video assets that may be of interest to a particular viewer. According to the embodiments, information about the content, which can be used to influence a recommendation of a particular segment of interest, may include historic viewing behavior data and content media analysis data.

With respect to viewing behavior data, such data may be obtained through collection of user interactions while watching content, such as fast forward, rewind, pause, play, stop, skip ahead, skip back/replay, slow motion, and other similar commands that affect the playback of the video. Often, these interactions occur via a remote control while watching the content on a primary (TV) screen, but could also occur on a secondary (phone/tablet) device, in a web browser on a computer, or any other manner in which video can be delivered. Interactions for a large population of unrelated viewers can be collected and analyzed. When such historic information is viewed in aggregate, it may indicate portions of content which may have been of lower interest (many fast forward or skip ahead events) or of higher interest (many rewinds or replay events) during past viewings of the content.

With respect to content media analysis data, such data may be obtained through automated analysis of video, audio and text components of a video asset. This analysis can determine several features of the video asset, including scene changes, identification of advertisements, level of activity or motion, relative importance, or relevance of segments, and similar information. In addition, media analysis may be used to recognize a face, location, structure, or use of key term at a specific time in a video asset or the topic of a segment or a part of the segment.

The operation of conventional recommenders may provide so-called pure collaborative filter recommendations, so-called pure content based filter recommendations, or pure knowledge-based filter recommendations. Each is discussed below by way of background.

Figure 1:
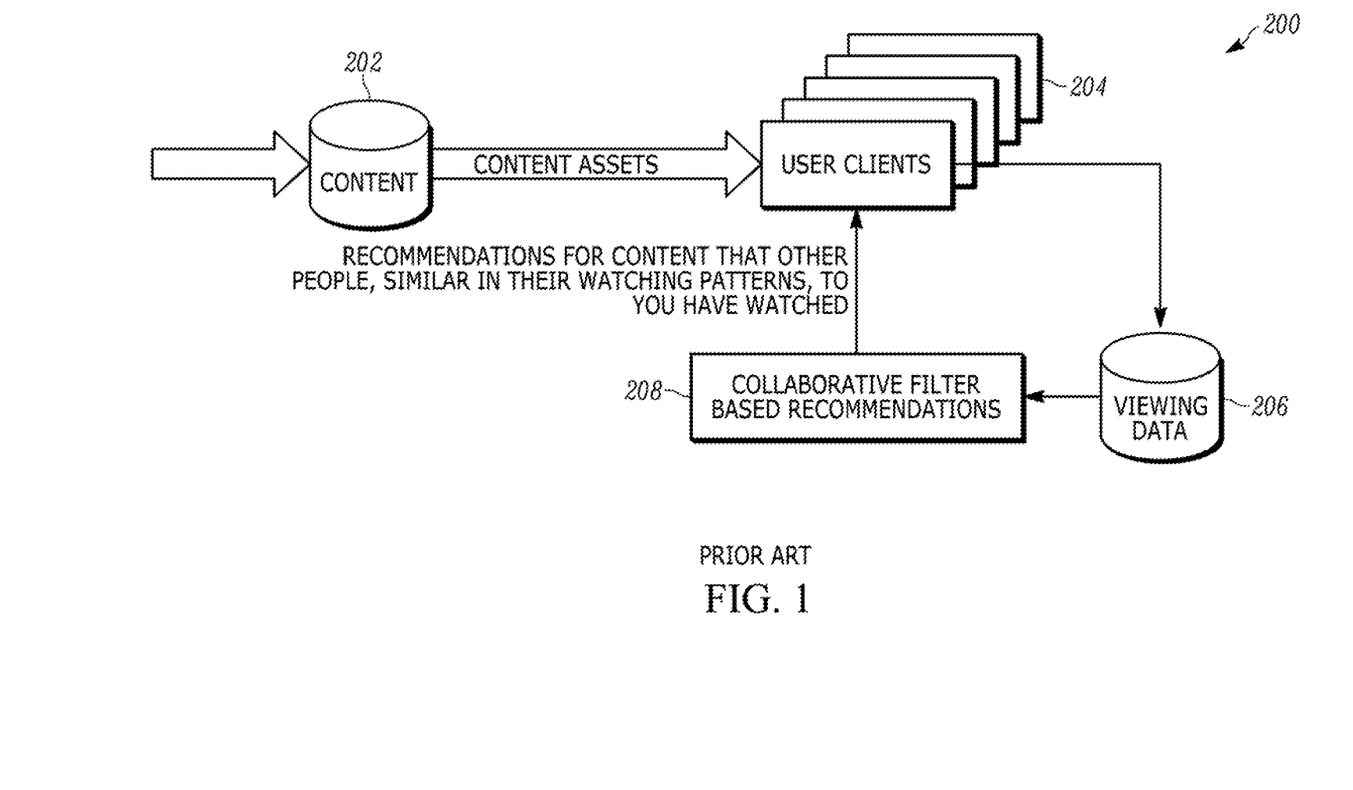
FIG. 1 is a schematic view of a conventional so-called pure collaborative filter recommender of content.

FIG. 1 provides a simplified diagram showing the operation of a conventional collaborative filter recommender 200. Content 202 is watched by numerous viewers 204, and viewing data 206 is recorded relative to the viewing of the assets as a whole and/or ratings of assets as a whole given by the viewers. A collaborative filter 208 searches for and establishes correlations of viewing or rating between unrelated viewers so that, for a particular single viewer, the system has a measure of a group of other views or ratings from unrelated viewers that have watched largely the same content as the particular single viewer.

The pure collaborative filter 208 considers no information concerning the content itself (i.e., genre, type, length, etc.); rather, the pure collaborative filter 208 simply measures a correlation between the content viewed or rated by a population of viewers. In making recommendations for a particular single viewer, the pure collaborative filter 208 looks for other unrelated viewers who have viewed the same content as, or have rated content similar to, the particular single viewer targeted for a recommendation, and recommends an asset that people with a high correlation have watched/rated but which the targeted viewer has not. For example, if other viewers that have watched content that the particular single viewer may watch, and if the other viewers liked or watched a particular asset, the particular asset may be recommended by the collaborative filter 208 to the particular single viewer.

For purposes of using the conventional collaborative filter recommender 200 discussed above, the recommended content or asset must have been previously viewed by other viewers; thus, the recommended content or asset necessarily cannot be so-called first-aired content. For instance, it may be recorded content. In addition, it is necessary that the recommended content is actually the same content viewed by other viewers on which data has been previously collected. Accordingly, when recommending personalized segmentation of content (discussed below in greater detail), it must be established that the segments being viewed by different viewers and being commented on are indeed the same content providing the same video content.

Figure 2:
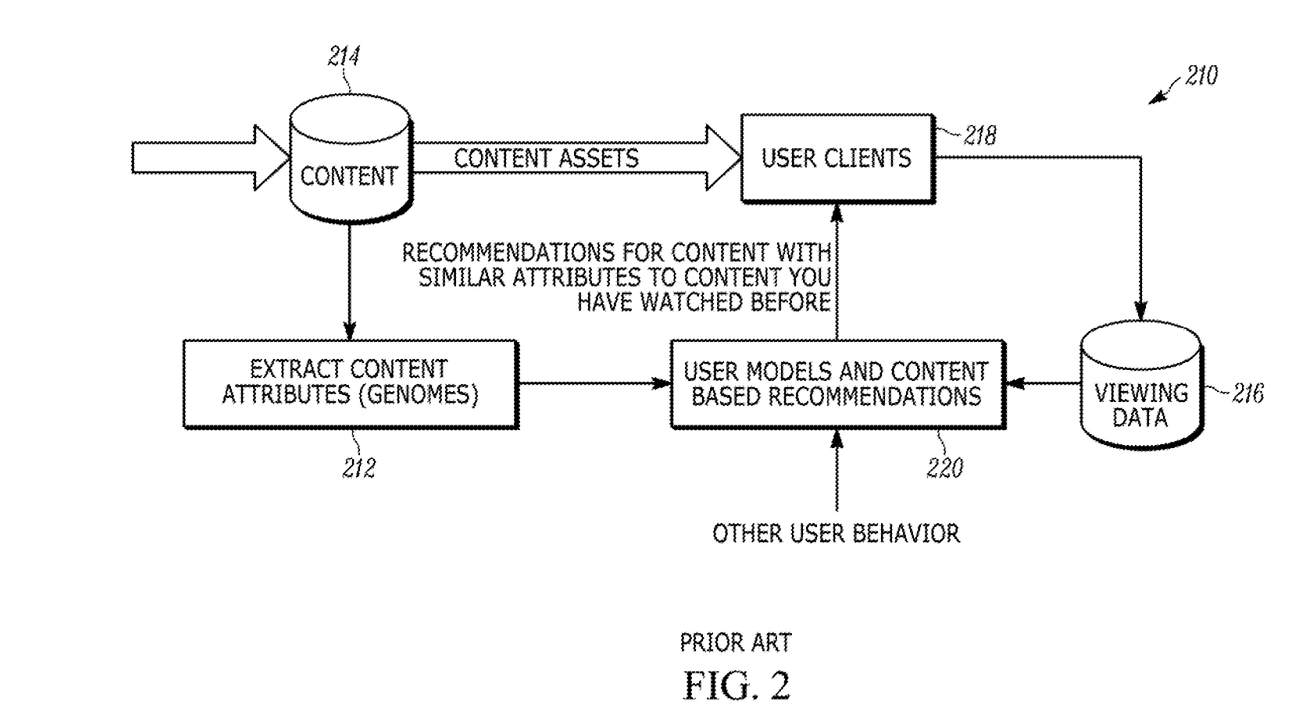
FIG. 2 is a schematic view of a conventional so-called pure content-based filter recommender of content.

FIG. 2 provides an example of a conventional so-called pure content based recommender 210. In this case, a component 212 of the recommender 210 extracts content attributes from the content or asset 214. For example, the attributes or genomes of the content as a whole may be genre or the like. In addition, a module 216 records a particular single viewer's 218 viewing patterns or ratings as a function of the attributes. A module 220 then generates recommendations for the viewer 218 based on the viewing patterns or "likes" that it measures for the particular single viewer 218 and the attributes of the content as a whole. As an example, if the viewer 218 frequently views a particular program, the recommender may recommend content or assets having similar attributes as the particular program.

A distinction of recommender 210 relative to recommender 200 is that the recommender 210 merely requires knowledge of the viewer's viewing patterns to make a recommendation. Thus, the recommended content may be first-aired content. The recommender 210 considers information relative to the attributes of the content as a whole having been previously viewed by the viewer and attributes of content as a whole being considered for recommendation. Thus, in recommending personalized segmentation of content (as discussed below in greater detail), the attributes of each individual segment of an asset must be known or established.

Figure 3:
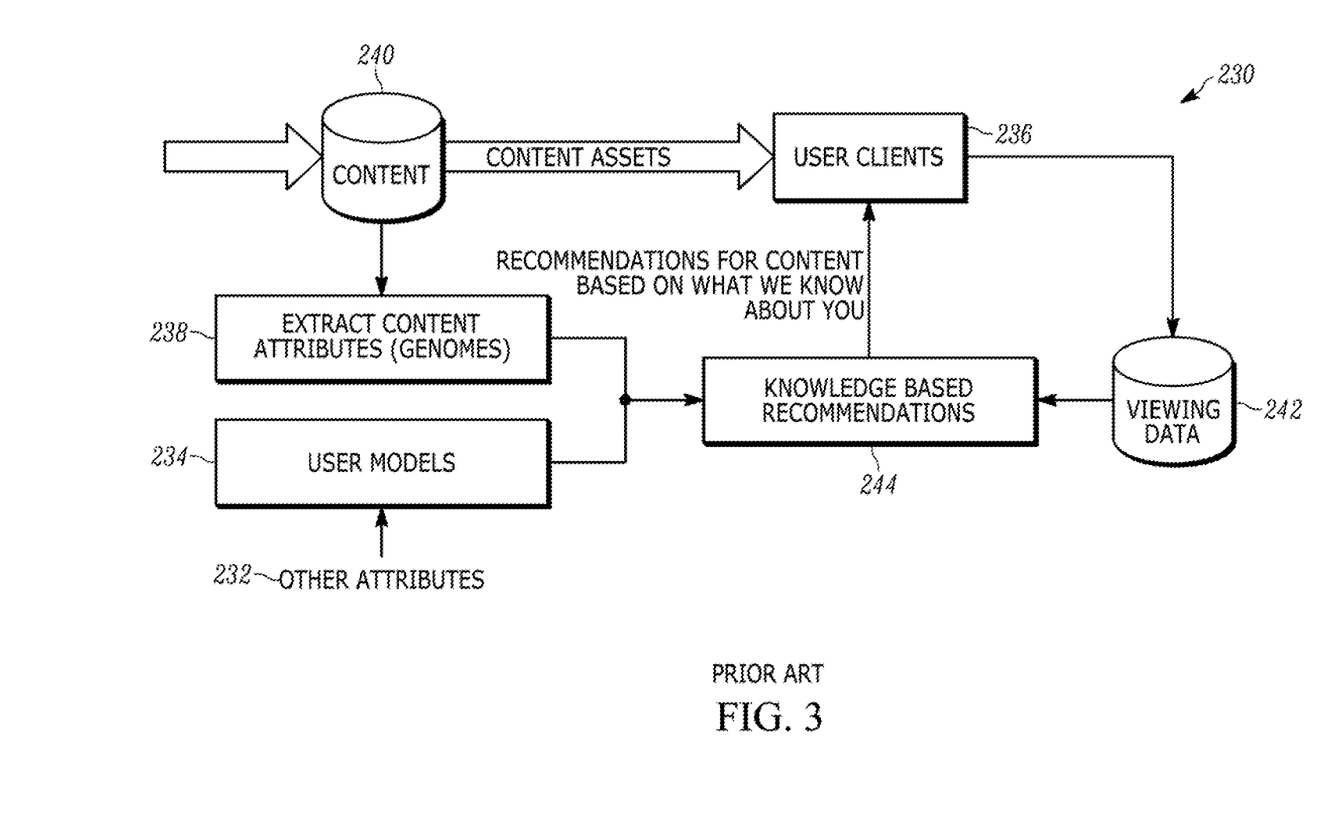
FIG. 3 is a schematic view of a conventional so-called pure knowledge-based filter recommender of content.

FIG. 3 provides a diagram of a so-called knowledge-based recommender 230 that uses actual knowledge concerning a user (i.e., so-called user attributes 232) stored in a user model component 234 to infer content as a whole to recommend to the particular user 236. For example, if the viewer 236 is a particular age, gender, etc., then the recommender 230 may recommend content specifically directed to the age, gender or like of the viewer 236. For this system, a component 238 of the recommender 230 extracts content attributes from the content or asset 240, and a module 242 records the viewer's viewing patterns or ratings as a function of the attributes. Thus, a module 244 generates recommendations for the viewer 236 which may be based on the viewing patterns or "likes" that it measures for the viewer and the attributes of the content and/or the attributes of the user.

In addition to the recommenders disclosed above, recommenders may also be hybrid combinations, for instance, of the three recommenders described above.

In applying each of the above techniques to a chaptered or segmented asset or item of content, the content-based or knowledge-based attributes must be known by a recommender for each individual segment that a viewer may have previously watched or that is available for recommendation. There exists a real time aspect with respect to deriving these attributes that may present a performance problem if the attributes are being generated on the fly in real time. In addition, it is necessary to ascertain information that two clips or segments viewed by different viewers contain either the same content or partially the same content so that attributes may be reused between segments. In a collaborative filter, based on the viewing habits of many different viewers, it is essential to know that clips being compared from different copies of an asset actually contain either the same content or partially the same content.

Situations may arise when segmentation of an asset is not uniform relative to other segmented versions of the same asset including a so-called standard version of an asset. For example, when segmentation is personalized, the contents are provided from different providers, the contents are sourced from different sources (i.e., a unique copy from an nDVR system), the contents differ in format (i.e., delivery bitrate, aspect ratio, etc.), and genomes used to determine matches are largely invariant to format differences, the segments of different recordings of an asset being compared may not actually provide the same content, or may provide content that only partially overlaps.

Accordingly, for embodiments disclosed herein, it is first established that a particular content segment viewed by a population of unrelated viewers is the same content segment or at least partially the same content segment from which viewing data is collected. In essence, a decision as to whether views of a segment by different viewers were views of the same segment (clip or chapter), views of partially the same segment, or views of entirely different segments is made.

Figure 4:
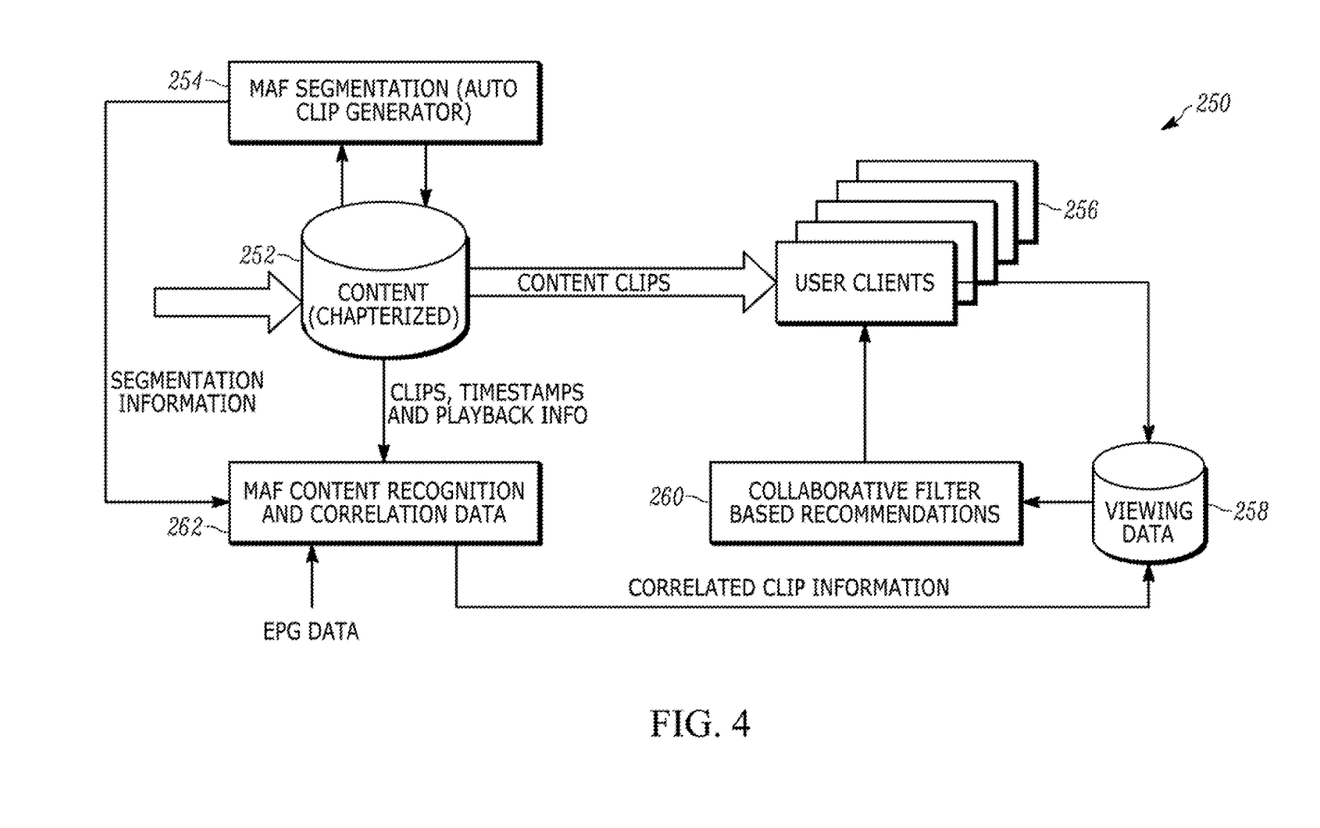
FIG. 4 is a schematic view of a clip collaborative filter recommender of segments of content in accordance to an embodiment.

FIG. 4 provides a diagram of an embodiment for a pure collaborative filter based recommendation system 250 in which a viewed segment of content between several different viewers is established as being the same or partially the same. The system 250 includes a content store 252 having content that is provided to a media analysis segmentation unit or component 254, which ingests whole content assets, analyzes the media and creates a set of segments, chapters or clips, which is then stored within the content store 252.

The media analysis provided by the media analysis segmentation unit or component 254 may include any form of metadata created by the analysis of media. By way of example and not by way of limitation, media analysis may include the analysis of video, audio and closed captions. Such time-tagged assets may be termed temporal metadata. As an a example, the temporal metadata may identify a face or the like appearing at specific time in an asset, a key term or word used at specific time in an asset, a predominate topic in part or all of the segment, or a person speaking in the segment and when.

The manner in which the content is segmented may be personalized to a user's known profile or customized to a content owner or broadcaster's needs. In the embodiment shown in FIG. 4, although the content may be supplied by a single provider (such as a Multiple System Operator (MSO)), the segments of the content may be generated by multiple different entities and access to the segments may be provided by various distribution channels (i.e., Internet, cable, etc.). As a result, the segments viewed by viewers may not necessarily be uniform in terms of start/end points, duration, and source of segments or clips.

When the above referenced segments of an asset or content are viewed by a population of viewers 256, the views are recorded by a viewing data unit or module 258, which supplies this information to a collaborative filter based recommender module 260. Thus, the primary function of the viewing data unit or module 260 is to record which viewer viewed which segments. The viewer's trick play actions (fast forward, rewind, etc.) during the course of viewing segments of an asset may also be recorded. For purposes of establishing that viewed content of various unrelated viewers is the same or partially the same, information from a content recognition and correlation data unit or module 262 is utilized.

The content recognition and correlation data unit or module 262 analyses clips or segments, timestamps, and playback information provided by the content store 252, segmentation information provided by the media analysis segmentation unit or component 254, and electronic program guide (EPG) information and correlates slips or segments and passes this information to the viewing data unit or module 258. Accordingly, having information that clips may contain the same or similar content, the collaborative filter based recommender module 260 may then recommend particular clips or segments for viewing by a particular viewer based on the media analysis and viewing data.

As discussed above, the content recognition and correlation data module 262 may gather metadata about each segment such as EPG metadata of the content segmented (i.e., title, season, episode numbers, and the like) and timestamp information of the start and end of the segment. The module 262 may recognize content based on media analysis and establish the start and end of the segment relative to a so-called "standard" version of the content used across the system. The module 262 may apply a temporal metadata generator to generate relatively low level (i.e., a recognized face at a specific time or a key term at a given time) and relatively high level (i.e., the topic of a segment or part of a segment) temporal metadata and create a semantic map of the segment based on the low and high level temporal metadata (i.e., predominate topic in part or all of the segment, or who is speaking in the segment and when); and deliver an output.

The output of the content recognition and correlation data module 262 may include an identifier of the content asset from which the segment was taken and start and end timestamps referenced to a system wide standard reference point for the whole asset. The module 262 may also generate a confidence level or score that the whole asset and start stop references are correctly established. Further, the module 262 may output EPG metadata, temporal metadata with timestamps, and semantic maps of the content segment.

The above information is output by the content recognition and correlation data module 262 to the viewing data module 258 which may perform functions including recording information of viewed content by each viewer, recording the viewers that reviewed each segment, and using the whole content asset identification and standard segment start and stop timestamps to identify which other users also watched all or part of a segment or clip. The module 258 may also apply a weighting or score on other users' viewing of the segment prior to the recommender function dependent on the amount of clip viewed by the other users, where viewing exactly the same clip may be assigned a value of 1.0, viewing none of the clip may be assigned a value of 0.0, and any partial viewing may be a linear or non-linear function of the overlap in viewing. The module 258 may further apply a weighting or score on other users' viewing of the segment prior to the recommender function dependent on the confidence in the overlapping viewed segment was correctly identified. Still further, the module 258 may apply a weighting or score on other users' viewings of the segment prior to the recommender function dependent on the overlap of the semantic mapping of the content, which may optionally be made a function of the current user's preference of that semantic content. The module 258 may output the above referenced weighted viewing metrics to the recommender (collaborative filter) 260 for making a recommendations based on the above discussed information.

Thus, according to the above described embodiment, segments or clips are identified as being wholly and partially the same in viewing metrics for a recommender by using media analysis to generate metadata useful as viewing metrics for a recommender and a semantic map of a segment is created that may be useful in viewing metrics for a recommender. The generated viewing metrics for segments may be weighted prior to their use in a recommender and additionally weighted by time overlap, confidence in identifying the segment, and/or by the semantic overlap.

Figure 5:
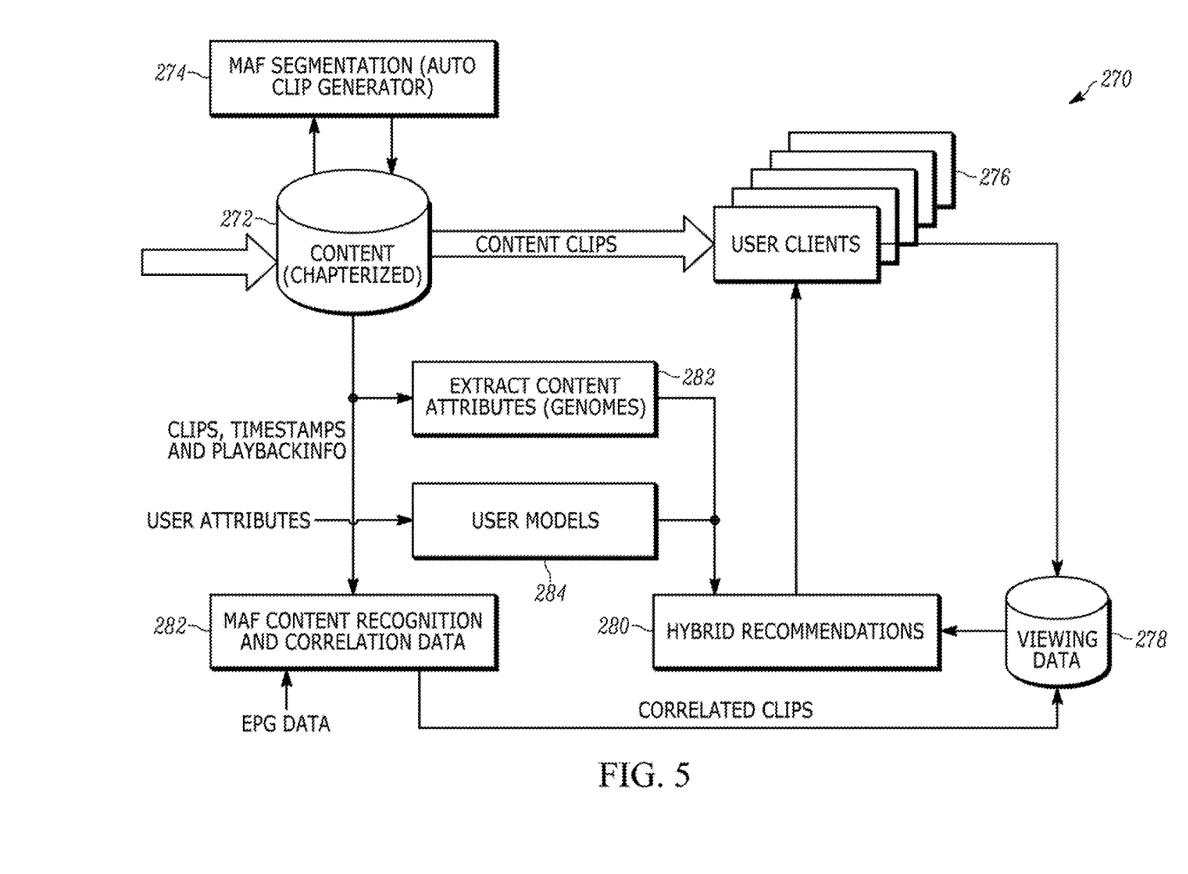
FIG. 5 is a schematic view of a clip collaborative filter recommender of segments of content in accordance to an embodiment.

FIG. 5 provides an embodiment of a clip hybrid recommender 270 which uses collaborative filtering and content and knowledge based components as discussed above. The content store 272 includes content that is provided to a media analysis segmentation component 274, which ingests whole content assets, analyzes the media and creates a set of segments, chapters or clips, which is then stored into the content store 272. The media analysis may include any form of metadata created by the analysis of media. By way of example and not by way of limitation, media analysis may include the analysis of video, audio and closed captions as well as analysis of collected historic user interactions (i.e., fast forward, rewind, etc.) or any other form of data gathering and analysis.

The manner in which the content is segmented may be personalized to a user's known profile or customized to a content owner or broadcaster's needs. Although the content may be supplied by a single provider (such as a Multiple System Operator (MSO)), the segments of the content may be generated by multiple different entities and access to the segments may be provided by various distribution channels (i.e., Internet, cable, etc.). As a result, the segments viewed by viewers may not necessarily be uniform in terms of start/end points, duration, and source.

When the above referenced segments of an asset or content are viewed by a population of viewers 276, the views are recorded by a viewing data module 278 which supplies this information to a hybrid recommendation module 280. For purposes of establishing between users that viewed content is the same or partially the same, information from a content recognition and correlation data module 282 is utilized. The content recognition and correlation data module 282 analyses clips or segments, timestamps, and playback information provided by the content store 272, segmentation information provided by the media analysis segmentation component 274, and electronic program guide (EPG) information and correlates slips or segments and passes this information to the viewing data module 278. Accordingly, having information that clips may contain the same or similar content, the hybrid recommendation module 280 may proceed to recommend particular clips or segments for viewing by a particular viewer.

In addition, a component 282 of the recommender 270 extracts content attributes from the clips or segments received from the content store 272, and a module 284 records the viewer's viewing patterns or ratings as a function of the attributes. Thus, the hybrid recommendation module 280 is able to generate recommendations for a particular viewer based on the viewing patterns or "likes" that it measures for the viewer and the attributes of the content and/or the attributes of the user as discussed above.

The content recognition and correlation data module 282 may perform the same or similar functions discussed above for content recognition and correlation data module 262, and the viewing data module 278 may perform the same or similar functions discussed above for the viewing data module 258.

Figure 6:
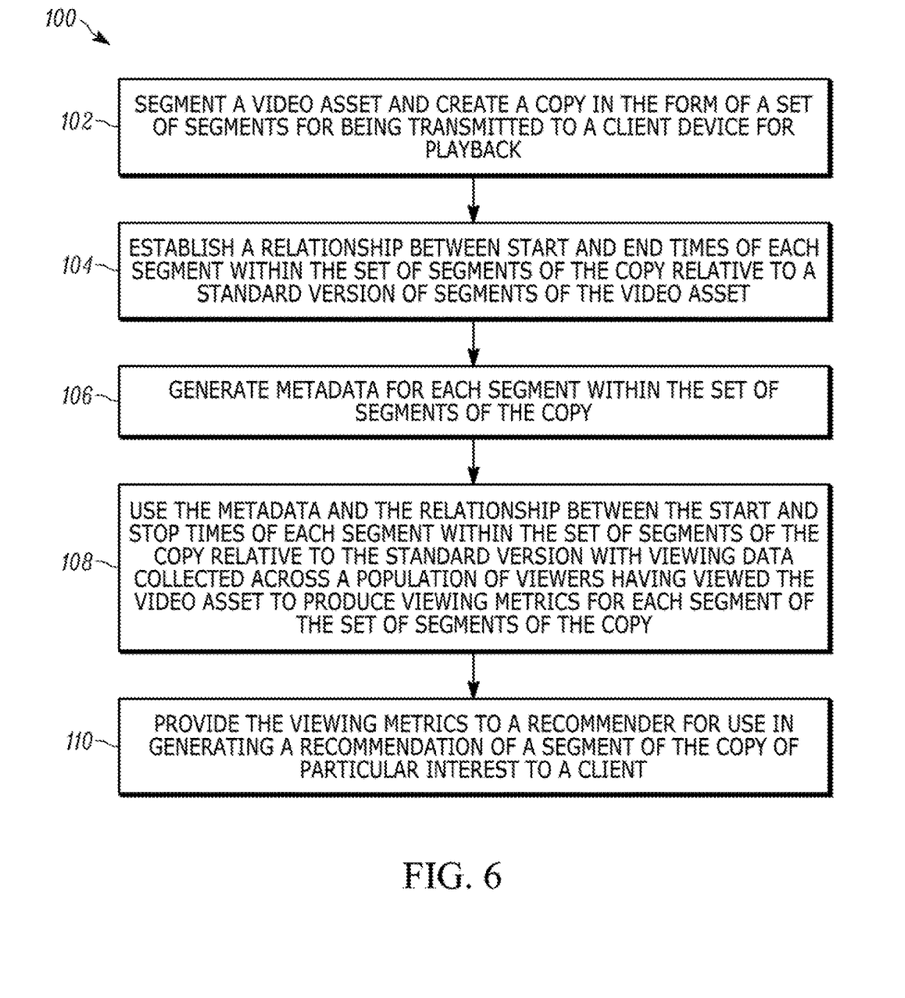
FIG. 6 is a flow diagram of a method of recommending a segment of a segmented video asset of particular interest to a client in accordance to an embodiment.

A flow diagram of a method 100 of recommending a segment of a segmented video asset of particular interest to a client is provided in FIG. 6. In step 102, a video asset is segmented and a copy is created in the form of a set of segments for being transmitted to a client device for playback. In step 104, a relationship between start and end times of each segment within the set of segments of the copy relative to a standard version of segments of the video asset is established, and in step 106, metadata is generated for each segment within the set of segments of the copy. The metadata and the relationship between the start and stop times of each segment within the set of segments of the copy relative to the standard version is used with viewing data collected across a population of viewers having viewed the video asset to produce viewing metrics for each segment of the set of segments of the copy in step 108. The viewing metrics are provided to a recommender in step 110. The recommender uses the viewing metrics to generate a recommendation of a segment of the copy of particular interest to a client.

A system for carrying out any of the above disclosed methods may include software or the like provided on a circuit board or within another electronic device and can include various processors, microprocessors, modules, units, components, controllers, chips, disk drives, and the like. It will be apparent to one of ordinary skill in the art that systems, modules, components, units, processors, servers, and the like may be implemented as electronic components, software, hardware or a combination of hardware and software for purposes of providing a system.

Embodiments may also include at least one non-transitory computer readable storage medium having computer program instructions stored thereon that, when executed by at least one processor, can cause the at least one processor to perform any of the steps described above.

While the principles of the invention have been described above in connection with specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of recommending a segment of a segmented video asset of particular interest to a client, comprising the steps of:

segmenting and creating a copy of a video asset such that the copy is in the form of a set of segments for being transmitted to a client device for playback;

establishing a relationship between start and end times of each segment within the set of segments of the copy relative to a standard version of segments of the video asset;

generating metadata for each segment within the set of segments of the copy;

using the metadata and the relationship between the start and stop times of each segment within the set of segments of the copy relative to the standard version with viewing data collected across a population of viewers having viewed the video asset to produce viewing metrics for each segment of the set of segments of the copy;

providing the viewing metrics to a recommender which uses the viewing metrics to generate a recommendation of a segment of the copy of particular interest to a client;

obtaining an identifier of the video asset and start and end timestamps of the segments of the standard version, measuring the viewing data from the population of viewers of the video asset, and using the identifier and the start and end timestamps of the segments of the standard version to identify the population of viewers that viewed all or part of a segment of the set of segments of the copy; and generating a weighting from the viewing data from the population of viewers that viewed all or part of a segment of the set of segments of the copy dependent on an amount of the segment of the copy viewed by the population of viewers such that a greatest weighting is generated when the amount equals the entire segment, a lowest weighting is generated when the amount equals none of the segment, and any partial viewing of the segment is determined as a linear or non-linear function of the amount.

2. The method according to claim 1, further comprising the step of recording viewing data across a population of viewers having previously viewed at least a part of the video asset.

3. The method according to claim 1, wherein, during said segmenting step, the set of segments of the copy created are a contiguous set of segments representing a whole of the video asset.

4. The method according to claim 1, further comprising the steps of obtaining metadata from an electronic program guide (EPG) of the video asset and determining timestamp information concerning the start and end times of each segment of the set of segments of the copy.

5. The method according to claim 1, wherein, during said generating step, media analysis of each segment is used to create the metadata.

6. The method according to claim 5, wherein the metadata is temporal metadata generated individually for each segment of the video asset.

7. The method according to claim 6, wherein the temporal metadata includes at least one of an identify a face appearing at specific time in the video asset, a location appearing at specific time in the video asset, a structure appearing at specific time in the video asset, a key term or word used at specific time in the video asset, a predominate topic in a segment of the video asset, and a person speaking in a segment the video asset.

8. The method according to claim 1, wherein the weighting is applied to the viewing metrics provided to the recommender.

9. A system of recommending a segment of a segmented video asset of particular interest to a client, said system comprising electronic apparatus having at least one processor configured to:
segment and create a copy of a video asset such that the copy is in the form of a set of segments for being transmitted to a client device for playback,
establish a relationship between start and end times of each segment within the set of segments of the copy relative to a standard version of segments of the video asset,
generate metadata for each segment within the set of segments of the copy,
use the metadata and the relationship between the start and stop times of each segment within the set of segments of the copy relative to the standard version with viewing data collected across a population of viewers having viewed the video asset to produce viewing metrics for each segment of the set of segments of the copy, and
provide the viewing metrics to a recommender which uses the viewing metrics to generate a recommendation of a segment of the copy of particular interest to a client;
wherein the system includes a segmentation unit for segmenting and creating the copy of a video asset, a content recognition and correlation unit for establishing a relationship between start and end times of each segment within the set of segments of the copy relative to the standard version of segments of the video asset, and a viewing data unit for using the metadata for each segment within the set of segments of the copy and the relationship between the start and stop times of each segment within the set of segments of the copy relative to the standard version with viewing data collected across a population of viewers having viewed the video asset to produce the viewing metrics for each segment of the set of segments of the copy;
wherein, the at least one processor of at least one of the content recognition and correlation unit and the viewing data unit is configured to obtain an identifier of the video asset and start and end timestamps of the segments of the standard version, to measure the viewing data from the population of viewers of the video asset, and to use the identifier and the start and end timestamps of the segments of the standard version to identify the population of viewers that viewed all or part of a segment of the set of segments of the copy; and
wherein, the at least one processor of at least one of the content recognition and correlation unit and the viewing data unit is configured to generate a weighting from the viewing data from the population of viewers that viewed all or part of a segment of the set of segments of the copy dependent on an amount of the segment of the copy viewed by the population of viewers such that a greatest weighting is generated when the amount equals the entire segment, a lowest weighting is generated when the amount equals none of the segment, and any partial viewing of the segment is determined as a linear or non-linear function of the amount.

10. The system according to claim 9, wherein, the at least one processor of the segmentation unit is configured to create a contiguous set of segments representing a whole of the video asset.

11. The system according to claim 9, wherein, the at least one processor of the content recognition and correlation unit is configured to obtain metadata from an electronic program guide (EPG) of the video asset and determine timestamp information concerning the start and end times of each segment of the set of segments of the copy.

12. The system according to claim 9, wherein, the at least one processor of at least one of the segmentation unit and the content recognition and correlation unit is configured to perform media analysis of each segment to create the metadata.

13. The system according to claim 12, wherein the metadata is temporal metadata generated individually for each segment of the video asset, and wherein the temporal metadata includes at least one of an identify a face appearing at specific time in the video asset, a location appearing at specific time in the video asset, a structure appearing at specific time in the video asset, a key term or word used at specific time in the video asset, a predominate topic in a segment of the video asset, and a person speaking in a segment the video asset.

14. The system according to claim 9, wherein, the at least one processor of the viewing data unit is configured to apply the weighting to the viewing metrics provided to the recommender.

15. A non-transitory computer-readable storage medium comprising stored instructions which, when executed by one or more computer processors, cause the one or more computer processors to perform steps of:
segmenting and creating a copy of a video asset such that the copy is in the form of a set of segments for being transmitted to a client device for playback;
establishing a relationship between start and end times of each segment within the set of segments of the copy relative to a standard version of segments of the video asset;
generating metadata for each segment within the set of segments of the copy;
using the metadata and the relationship between the start and stop times of each segment within the set of segments of the copy relative to the standard version with viewing data collected across a population of viewers having viewed the video asset to produce viewing metrics for each segment of the set of segments of the copy;
providing the viewing metrics to a recommender which uses the viewing metrics to generate a recommendation of a segment of the copy of particular interest to a client;
obtaining an identifier of the video asset and start and end timestamps of the segments of the standard version, measuring the viewing data from the population of viewers of the video asset, and using the identifier and the start and end timestamps of the segments of the standard version to identify the population of viewers that viewed all or part of a segment of the set of segments of the copy; and
generating a weighting from the viewing data from the population of viewers that viewed all or part of a segment of the set of segments of the copy dependent on an amount of the segment of the copy viewed by the population of viewers such that a greatest weighting is generated when the amount equals the entire segment, a lowest weighting is generated when the amount equals none of the segment, and any partial viewing of the segment is determined as a linear or non-linear function of the amount.

* * * * *